United States Patent Office 3,432,334
Patented Mar. 11, 1969

3,432,334
METHOD OF APPLYING OXIDATION PROTECTIVE COATINGS TO COLUMBIUM
David L. Yenawine, Moodus, and Emanuel C. Hirakis, Mansfield Center, Conn., assignors to United Aircraft Corporation, East Hartford, Conn., a corporation of Delaware
No Drawing. Filed Dec. 2, 1963, Ser. No. 327,554
U.S. Cl. 117—70       5 Claims
Int. Cl. C23d 5/00; C23c 3/00; C03c 3/18

This invention relates to coating compositions and methods of preparing and applying oxidation protective coatings to columbium and its alloys.

Because of its property of good strength at high temperatures, columbium and certain of its alloys have been proposed for nuclear reactor applications, particularly for containment of high temperature liquid metals and for metal parts located in a high temperature inert gas environment. However, columbium, unless protected, is subject to severe oxidation which becomes catastrophic at high temperatures. Also it is readily contaminated by certain impurities, for example, nitrogen and oxygen which are present in inert gas atmospheres at temperatures up to 2000° F.

It is an object of this invention to provide coating compositons and methods of preparing and applying them to columbium base metals which are capable of protecting these metals against oxidation over a wide range of temperatures up to 2000° F.

More specifically, it is an object of this invention to provide a coating composition consisting essentially of metal powder in a glass supporting medium which, as a result of a reaction with the base columbium when applied as a coating, produces an intermetallic protective surface on the base metal capable of protecting the base metal against oxidation.

Another object of this invention is the incorporation of specific fluxing materials in glass which assist in the successful application of the oxidation resistant coating.

A further object of this invention is to provide a surface coating slurry consisting essentially of metal powder in a fluoride glass suspension.

Further objects of the invention are the provision of new methods of preparing and applying such oxidation resistant coatings to columbium base metals.

These and other objects and advantages of the invention will become evident from the following detailed description of the improved coatings and methods of making and applying them.

To achieve the foregoing objects and in accordance with the above-stated purposes, this invention provides essentially an aluminum powder mixed with a fluoride glass and water to form a coating slurry which may be applied directly to the columbium surfaces to be protected by dipping, spraying, or painting techniques.

THE FLUORIDE GLASS

In preparing the fluoride glass ($F_3$), the followingg ingredients are thoroughly mixed, all percentages by weight: 60% LiF, 3.2 $CaF_2$, 17.6% $AlF_3$ and 19.2% NaF. These materials are all reagent grade chemicals, 100%–100 mesh. The mixture is melted at 1550° F. using a silicon carbide crucible and held in the liquid state at temperature for five minutes. The crucible containing the molten glass is then placed in a remotely controlled pouring apparatus and the molten glass is poured slowly and evenly into a ten-gallon container of water. The container should have a stainless steel screen supported approximately two inches from the bottom. Since explosions sometimes occur during pouring, it is necessary that proper precautions be taken, including pouring from a remote position, wearing of hoods, asbestos gloves, coat and leg guards.

Following pouring, the excess water is poured off and the fritted glass is dried at 300° F., after which it is ground in a mechanical grinder to −60 mesh. The glass powder is next ground in a wet ball mill for 48 hours using one-half volume of procelain balls ⅜ to 1 inch in diameter and sufficient powder to ¾ fill the mill with water to cover. The glass sediment is then dried for 24 hours at 390° F. Next the glass powder is ground in either a dry ball mill using ½ volume of balls and ¼ volume glass for one hour, or in a mortar and pestle. The glass powder is then screened through a 200 mesh sieve. Any material larger than 200 mesh must be reground and again screened. The −200 mesh dry glass powder is stored in sealed bottles. The fluoride glass above-described was formulated to have a very low melting point. This enables heat treating in air and protects the columbium beginning at a low temperature.

The functions of the fluoride glass are to clean oxides from the columbium base metal to be coated and also from the metal powder (Al) that is the primary coating material, to protect all involved metal surfaces from oxidation during formation of the coating, to transfer all of the metal powder to the surface both by physical contact and by solution of the metal powders in the glass providing transfer to the coated metal surface where these metals are removed by reaction in the formation of columbium alloys. The fluoride glass further provides a suspending agent to allow ease of application of the slurry to the metal to be coated and to hold the dried material in place during curing of the coating.

THE METAL POWDERS

Aluminum is the primary coating constituent producing $CbAl_3$ on reaction with Cb. Aluminum has been deposited on columbium from a fluoride glass ($F_3$) by a heat treatment of one hour at 1800° F. in an impure argon atmosphere. Metallographic inspection and a micro-hardness traverse suggest that the metal layer thought to be deposited was in actuality a layer of $CbAl_3$. The brittleness of this layer and the fact that it exists after several days at 1800° F. in air support this supposition. Also a layer made on Cb-20Ti by this method was identified as $CbAl_3$ by X-ray. The layer applied by the above methods protected a Cb-20Ti tab for 1128 hours at 1800° F. in air with daily thermal shocking which indicates that the layer is all $CbAl_3$ since no aluminum would be present after 1128 hours at these conditions.

Beside the primary metal coating constituent (Al), chromium is beneficially used as a secondary metal constituent in the fluoride glass slurry. The chromium alloys with the $CbAl_3$ to form a more oxidation resistant compound that is more uniform in thickness on complex configurations than $CbAl_3$ alone.

Si, Ti, Sn and Zn metal powders have been found beneficial when added to the basic Al powder to improve properties of the coating at specific temperatures.

COATING PREPARATION

Common procedure is to mix all the solid constituents of the coating for storage so that only the addition of water is required at the time the coating is to be applied. The slurry of fluoride glass and the metal powders has a very short shelf life, which may be only a matter of minutes. This is caused by the high pH in the slurry caused by the fluordies in the solution. To overcome this disadvantage, and give the slurry a shelf life of over a month, a chromic oxide ($CrO_3$) is added to the glass as a buffering agent which effectively overcomes the exothermic reaction which otherwise takes place when aluminum and fluoride glass are combined with water to make a slurry. By combination with $H_2O$ in the slurry, the chromium oxide ($CrO_3$) becomes chromic acid ($H_2CrO_4$).

The preferred coating material consists of the following materials:

50 grams (90 w/o Al+10 w/o Cr)+17 grams of a fluoride glass +0.40 grams $CrO_3$. The aluminum powder should be −200 mesh technical grade aluminum and the chromium powder should be −325 mesh +99% pure chromium.

These are thoroughly mixed and 33 cc. of tap water is added to the powders and thoroughly mixed. This amount of slurry will cover approximately 650 square inches of surface. The viscosity of the slurry, as required by the particular method of applying it to the metal surface, can be adjusted by further additions of water. Preferably, the slurry should be prepared from the dry powders just prior to using it. If stored, it should not be placed in a sealed container because of gas evolution and resultant pressure buildup. All metal surfaces not to be coated, such as tube inside surfaces, must be sealed off or otherwise protected from contamination during subsequent firing operations.

COATING PROCEDURE

The coating slurry is applied by dipping, spraying, or painting in a single slurry application uniformly covering all areas to be protected. The coating is then air dried by heating in an oven at 250–300° F. for about 30 minutes. The coated parts should be handled carefully to prevent the dried coating from flaking off. The coated parts are then placed in a retort, making sure that the parts are adequately supported. The portions of any fixtures contacting the coating must be of $Al_2O_3$, Mullite or some other equally stable oxide. The retort is then sealed and checked for leakage. The retort is purged at room temperature with inert atmosphere for a minimum of 25 volume changes. The inert atmosphere flow rate should be adjusted to a minimum of 15 room temperature retort volume changes per hour.

The retort is then placed in a furnace preheated to 1800–1900° F. and held at temperature for one hour, after which the inert atmosphere purge is continued until the retort and its contents have cooled to below 300° F.

Columbium alloy parts coated in accordance with the above-described method have given very good results under test. For example, Cb–1Zr finned radiator tubes heated to 1800° F. by resistance and subjected to a substantial airflow were found to be protected against corrosion after 350 hours. Panels of Cb–1Zr heated to 1800° F. in air in an electric furnace were in good condition after 1000 hours.

Test results also demonstrate that the coating layer shows no oxygen penetration of the coating on Cb-1Zr after 3000 hours at 1800° F. in a contaminated argon atmosphere.

The coating of this invention has been fired successfully with a torch and in an electric furnace with air atmosphere. The torch is used when it is not possible to place the metal part to be coated in a furnace. The air furnace is used when an argon furnace is not available. The use of a furnace is preferable to a torch since temperature control and flame-gas velocity are problems with a torch. The limiting requirement is that the coated part must be heated to at least 1200° F. in several minutes, as Cb oxidizes readily in the temperature range of from 500–1200° F. and the fluoride glass is not molten at these temperatures and therefore not protective. If a small amount of oxidation occurs in bringing the parts to be coated up through this 500–1200° F. range, the fluoride glass will remove the oxide when the glass melts. It will thus be evident that the coating process of this invention is very adaptable to varying circumstances and can be used to patch a previous coating as, for example, to protect weld areas.

Under some conditions a sealing glass is applied as a second coat after the part to be coated has been given the basic coating and this has been fired. The sealing glass may be $7B_2O_3+1SiO_2$ or $4SiO_2+0.5KBF_4+0.5(K_2B_4O_7 +4H_2O)$. Either will give good results. These sealing glasses were designed to fuse as low as 800° F. to melt at very low temperatures (<1400° F.) and to remain stable at temperatures above 1800° F. They are stable to a lesser degree at 2100° F. These glasses can be replaced with a high temperature enamel for parts that can be heated quickly to temperatures above 1800° F., but for large parts that must necessarily be heated more slowly these two glasses are best.

Like the initial coating, the sealing glass may be applied by dipping, painting or spraying. The sealing glass as basic constituents is suspended in water and applied to the coated parts. The parts are then heated in air to 1400–1800° F. to melt the sealing glass and form a second continuous seal.

For oxidation tests in air the second glass seal was found to be normally required although at times it was found not necessary. For reliability, it is required. In several tests at 1800° F. twenty specimens of a columbium alloy were coated with the basic intermetallic coating and the second glass coating. All lasted over 1000 hours at 1800° F. in air without oxidation. At 1600° F. and 1200° F. results were even better.

TESTS

Example #1.—The basic fluoride-metal coating without the second glass seal has been found by tests to be excellent in the prevention of oxidation in contaminated argon at temperatures between 1200 and 1800° F. In tests at 1800° F. coated specimens of Cb–1Zr were found to contain less oxygen after 10,000 hours than control specimens taken before test. A 500-hour test at 2000° F. in helium containing 1000 p.p.m. air showed no trace of oxidation.

Example #2.—Tests in impure argon or helium with only the basic fluoride-metal coating on 30 Cb parts showed no evidence of contamination in any case after 10,000 hours at 1800° F. Uncoated tabs failed within 100 hours in the same furnace.

Example #3.—500 hours at 2000° F. on a pressure vessel containing lithium at 300 p.s.i. hoop stress in an atmosphere of helium containing 1000 p.p.m. air resulted in no signs of oxidation. In this test the basic coating was cured in an argon resistance furnace in an argon flow but with no seals to insure good atmosphere. Patches over areas that had been ground off were applied and allowed to cure in test.

It will be evident that as a result of this invention a novel use of metal powder in a glass supporting medium has been developed to produce a reaction with the base columbium metal in which an oxidation protective coating is formed.

It will also be apparent that as a result of this invention it is possible to coat metal parts of columbium and its alloys of complex shapes against oxidation by the codeposition of glass and metal powders. Further, the coating process of this invention can be carried out on parts which may be too large to be fired in a furnace or under circumstances when a furnace is not available.

It will be understood that various changes may be made in the composition of the oxidation protective slurry and in the method of applying it without departing from the scope of the invention as defined by the following claims.

We claim:

1. The method of protecting columbium and columbium base alloy parts against oxidation which consists in preparing a coating slurry consisting essentially of a metal powder, a fluoride-glass powder and water, applying the coating to the surface of the parts to be coated, drying the coating by heating in an oven at 250–300° F. for about 30 minutes, and curing at 1800–1900° F. for about one hour.

2. The method of protecting columbium and columbium alloys against oxidation which consists in preparing a coating slurry consisting essentially of 50 grams (90 w/o Al+10 w/o Cr)+17 grams of a fluoride glass +0.40 grams $C_rO_3$+33 c.c. $H_2O$, applying the slurry to the parts to be coated, drying the coating by heating in an oven for about 30 minutes at 250–300° F., curing at 1800–1900° F. for one hour, applying a low melting point sealing glass to the coated surface, and curing the sealing glass in a furnace at 1400–1800° F.

3. The method of protecting columbium and columbium base alloy parts against oxidation which consists in preparing a coating slurry consisting essentially of aluminum and chromium powder in the proportion of 90 w/o Al+10 w/o Cr, and fluoride-glass powder consisting of 60 w/o LiF+3.2 w/o $CaF_2$+17.6 w/o $AlF_3$+19.2 w/o NaF, coating the parts to be protected with the slurry, drying the coated parts at 250–300° F. for about 30 minutes, curing for one hour at 1800–1900° F., applying a coating of sealing glass, and curing at 1400–1800° F.

4. The method of obtaining an intermetallic coating of chromium-modified columbium-aluminide on columbium base metals which consists in preparing a water base slurry of fluoride glass and fine metallic particles and applying this slurry at room temperature to the surface of the metal to be coated, drying the coating in air and heat treating the coated metal at a emperature above 1400° F.

5. The method of imparting an oxidation resistant chromium-modified intermetallic columbium-aluminide surface to columbium base metal by applying to the surface to be coated an aqueous slurry consisting of aluminum and chromium powders in a fluoride-glass suspension at room temperature, and subjecting the coated surface to a heat treating temperature of at least 1400° F.

References Cited

UNITED STATES PATENTS

| | | | |
|---|---|---|---|
| 3,130,061 | 4/1964 | McMahon et al. | 106—84 |
| 3,080,247 | 3/1963 | Slayter | 106—286 |
| 3,062,684 | 11/1962 | Treseder et al. | 117—127 |
| 3,110,616 | 11/1963 | Brooks et al. | 117—127 |

RALPH S. KENDALL, *Primary Examiner.*

U.S. Cl. X.R.

29—197; 106—1; 117—71, 129, 131